United States Patent
Medvinsky et al.

(10) Patent No.: US 7,243,366 B2
(45) Date of Patent: Jul. 10, 2007

(54) KEY MANAGEMENT PROTOCOL AND AUTHENTICATION SYSTEM FOR SECURE INTERNET PROTOCOL RIGHTS MANAGEMENT ARCHITECTURE

(75) Inventors: Alexander Medvinsky, San Diego, CA (US); Petr Peterka, San Diego, CA (US); Paul Moroney, Olivehain, CA (US); Eric Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 964 days.

(21) Appl. No.: 10/092,347

(22) Filed: Mar. 4, 2002

(65) Prior Publication Data

US 2003/0093694 A1    May 15, 2003

Related U.S. Application Data

(60) Provisional application No. 60/334,721, filed on Nov. 15, 2001.

(51) Int. Cl.
| | |
|---|---|
| G06F 17/30 | (2006.01) |
| G06F 7/04 | (2006.01) |
| G06K 9/00 | (2006.01) |
| H04L 9/32 | (2006.01) |
| H04L 9/00 | (2006.01) |

(52) U.S. Cl. .............................. 726/2; 726/10; 705/65; 709/226

(58) Field of Classification Search ................ 713/201, 713/168; 705/64–69; 726/5, 10, 2; 709/726
See application file for complete search history.

(56) References Cited

U.S. PATENT DOCUMENTS 5,455,953 A    10/1995    Russell (Continued)

FOREIGN PATENT DOCUMENTS

EP    1041823 A2    10/2000

(Continued)

OTHER PUBLICATIONS

Ganesan, Ravi; "Yaksha: Augmenting Kerberos with Public Key Cryptography"; *Proceedings of the Symposium on San Diego, CA*; 1995, pp. 132-143, XP010134533.

(Continued)

*Primary Examiner*—Gilberto Barron, Jr.
*Assistant Examiner*—Samson Lemma
(74) *Attorney, Agent, or Firm*—Robert P. Marley

(57) ABSTRACT

A digital rights management architecture for securely delivering content to authorized consumers. The architecture includes a content provider and a consumer system for requesting content from the content provider. The content provider generates a session rights object having purchase options selected by the consumer. A KDC thereafter provides authorization data to the consumer system. Also, a caching server is provided for comparing the purchase options with the authorization data. The caching server forwards the requested content to the consumer system if the purchase options match the authorization data. Note that the caching server employs real time streaming for securely forwarding the encrypted content, and the requested content is encrypted for forwarding to the consumer system. Further, the caching server and the consumer system exchange encrypted control messages (and authenticated) for supporting transfer of the requested content. In this manner, all interfaces between components are protected by encryption and/or authenticated.

2 Claims, 5 Drawing Sheets

U.S. PATENT DOCUMENTS

| | | | |
|---|---|---|---|
| 5,535,276 | A | 7/1996 | Ganesan |
| 6,189,146 | B1 | 2/2001 | Misra et al. |
| 6,389,541 | B1 | 5/2002 | Patterson |
| 6,591,250 | B1 | 7/2003 | Johnson et al. |
| 6,615,258 | B1 | 9/2003 | Barry et al. |
| 6,799,214 | B1* | 9/2004 | Li ............................... 709/226 |
| 2001/0052083 | A1* | 12/2001 | Willins et al. .............. 713/201 |
| 2002/0047899 | A1 | 4/2002 | Son et al. |
| 2002/0049679 | A1 | 4/2002 | Russell et al. |
| 2002/0059624 | A1* | 5/2002 | Machida et al. .............. 725/91 |
| 2002/0099948 | A1 | 7/2002 | Kocher et al. |
| 2002/0133699 | A1 | 9/2002 | Pueschel |
| 2002/0172368 | A1* | 11/2002 | Peterka ....................... 380/278 |
| 2003/0005144 | A1 | 1/2003 | Engel et al. |
| 2003/0046238 | A1 | 3/2003 | Nonaka et al. |
| 2003/0140257 | A1* | 7/2003 | Peterka et al. .............. 713/201 |
| 2003/0236745 | A1 | 12/2003 | Hartsell et al. |
| 2005/0216731 | A1 | 9/2005 | Saito et al. |

FOREIGN PATENT DOCUMENTS

| | | |
|---|---|---|
| EP | 1 089 488 A1 | 4/2001 |
| WO | WO 00/11849 A1 | 3/2000 |
| WO | WO 01/56249 A1 | 8/2001 |
| WO | WO 01/98903 A1 | 12/2001 |
| WO | WO 01/99374 A2 | 12/2001 |
| WO | WO 01/99374 A3 | 12/2001 |
| WO | WO 02/45316 A2 | 6/2002 |
| WO | WO 02/45316 A3 | 6/2002 |
| WO | WO 02/084980 A1 | 10/2002 |
| WO | WO 03/045036 A2 | 5/2003 |

OTHER PUBLICATIONS

Kohl, J., et al.; "The Kerberos Network Authentication Service (V5)"; *Network Working Group Request for Comments*, 1993 pp. 1-97 No. 1510, XP002929784.

Aura, Tuomas, "Distributed Access-Rights Management With Delegation Certificates," Secure Internet Programming (LNCS 1603), pp. 211-235, 1999.

Christin, Nicolas, "Multicasting Of Real-Time Data RTP, RTCP, RTSP," 43 pages, Nov. 9, 1999.

Maughan, D. et al., "Internet Security Association And Key Management Protocol (ISAKMP)," The Internet Society, 81 pages, Nov. 1998.

Schulzrinne, H. et al., "RTP: A Transport Protocol For Real-Time Applications," 75 pages, Jan. 1996.

* cited by examiner

KEY MANAGEMENT PROTOCOL AND AUTHENTICATION SYSTEM FOR SECURE INTERNET PROTOCOL RIGHTS MANAGEMENT ARCHITECTURE

CROSS-REFERENCES TO RELATED APPLICATIONS

This application claims priority from U.S. Provisional Patent Application No. 60/334,721 filed Nov. 15, 2001 entitled KEY MANAGEMENT PROTOCOL AND AUTHENTICATION SYSTEM FOR SECURE INTERNET PROTOCOL RIGHTS MANAGEMENT ARCHITECTURE, and U.S. patent application Ser. No. 09/966,552, entitled "UNIQUE ON-LINE PROVISIONING OF USER SYSTEMS ALLOWING USER AUTHENTICATION" filed Sep. 26, 2001, which are hereby incorporated by reference, as if set forth in full in this document, for all purposes. This application is related to the following U.S. non-provisional applications, U.S. patent application Ser. No. 10/194,922, entitled "KEY MANAGEMENT INTERFACE TO MULTIPLE AND SIMULTANEOUS PROTOCOLS" filed Jul. 21, 2002; U.S. patent application Ser. No. 10/170,951, entitled "ACCESS CONTROL AND KEY MANAGEMENT SYSTEM FOR STREAMING MEDIA" filed Jun. 12, 2002; U.S. patent application Ser. No. 10/183,130, entitled "ENCRYPTION OF STREAMING CONTROL PROTOCOLS SUCH AS RTCP AND RTSP AND THEIR HEADERS TO PRESERVE ADDRESS POINTERS TO CONTENT AND PREVENT DENIAL OF SERVICE" filed Jun. 25, 2002; and U.S. patent application Ser. No. 10/153,445, entitled "ASSOCIATION OF SECURITY PARAMETERS FOR A COLLECTION OF RELATED STREAMING PROTOCOLS: RTP, RTSP, RTCP" filed May 21, 2002, all of which are hereby incorporated by reference in their entirety as if set forth in full in the present invention, for all purposes.

BACKGROUND OF THE INVENTION

The present invention relates generally to the field of data communication and more specifically to digital rights management functions for securely communicating content between components of a network.

Conventional digital rights management systems for securing content transmitted through communication networks, such as the Internet, are becoming well known. Rights management systems are needed because a fundamental problem facing content providers is how to prevent the unauthorized use and distribution of digital content. Content providers are concerned with getting compensated for their content and depriving authorized consumers of such content.

Many digital right management schemes are typically implemented using "encryption/decryption" of the digital content. Encryption is the conversion of data into an unintelligible form, e.g., ciphertext, that cannot be easily understood by unauthorized clients. Decryption is the process of converting encrypted content back into its original form such that it becomes intelligible. Simple ciphers include the rotation of letters in the alphabet, the substitution of letters for numbers, and the "scrambling" of voice signals by inverting the side-band frequencies. More complex ciphers work according to sophisticated computer algorithms that rearrange the data bits in digital information content.

In order to easily recover the encrypted information content, the correct decryption key is required. The key is a parameter to both the encryption and decryption algorithms, where a different value of a key produces an unpredictably different result during both the encryption and decryption processes. The larger the key size, the more difficult it becomes to correctly guess the value of the key and thus decode the communications without the knowledge of the key. Generally, there are two types of key schemes for encryption/decryption systems, namely (1) PKS (public key systems) or asymmetric systems which utilize two different keys, one for encryption, or signing, and one for decryption, or verifying; and (2) nonpublic key systems that are known as symmetric, or secret key, systems in which typically the encryption and decryption keys are the same. With both public and secret keys systems, key management is employed to distribute keys and properly authenticate parties for receiving the keys.

One related art key management system developed at MIT is known as the Kerberos protocol. Kerberos is a key management protocol, allowing a party to establish shared session keys with different network services by using a KDC (key distribution center) and the concept of tickets. A ticket is used to securely pass to a server a session key along with the identity of the client for whom the ticket was issued. A ticket is tamperproof and can be safely stored by the clients, allowing servers to remain stateless (a server can re-learn the session key each time that the client passes it the ticket). Thus, the concept of tickets improves scalability of servers in terms of the number of clients that they can support. Disadvantageously, Kerberos is relatively complex and includes many different options, which are not always applicable to particular applications. Moreover, modifying such a complex system is no option because such modifications to an unfamiliar system adds the risk of introducing additional errors. Another disadvantage of Kerberos is that it does not specify the details of performing key management between a client and a server once a ticket is obtained (only some basic building blocks are provided).

A growing interest in streaming distribution of multimedia content over Internet Protocol (IP) networks has resulted in a growing need for key management systems. One such streaming distribution system is the Aerocast Network™ developed by Aerocast, Inc. of San Diego, Calif. As discussed with reference to FIG. 1, although the existing phase 1 Aerocast Network facilitates delivery of content, it lacks security and key management for the network.

FIG. 1 is a block diagram of a network 100 (by Aerocast) for facilitating streaming of content over a communication network. Among other components, network 100 includes a content provider 102 for generating content intended for a consumer 116, Internet 114 through which content is streamed, and a central server 104 to which content provider 102 publishes its contents. Central server 104 contains a database 108 for storing content information, and a search engine 110 for searching database 108. Network 100 further comprises a provisioning center 106, and caching servers 112, 113 and 115.

In operation, consumer 116 wishing to access content by content provider 102, streams the content from the closest caching server, in this case, caching server 115. In conventional systems without caching servers, consumer 116 desiring such content streams obtains content directly from content provider 102. Not only does this result in poor content quality, delays associated with inadequate bandwidth may result. By using the caching servers, network 100 avoids disadvantages associated with direct streaming of digital content from content provider 202. Caching servers 112, 113 and 115 may be local DSL (digital subscriber line) providers, for example.

Network 100 provides a further advantage. When searching for content, consumer 116 need not search any and all databases on Internet 114. All content providers (including content provider 102) on network 100 publish descriptions of their content to a single central database 108. For video content for example, such descriptions may include the movie name, actors, etc. In this manner, when content is desired, consumer 116 uses search engine 110 to search database 108. When the content is found, database 108 thereafter provides a link to content provider 202 having the desired content. Content provider 102 is then accessed by consumer 116 to view a more detailed description and other metadata that is associated with the content.

A mechanism is provided whereby consumer 116 provides a list of caching servers closest to it to content provider 102. In response to consumer 116's request, content provider 102 selects the appropriate caching server closest to consumer 116 for streaming the content. It should be observed, however, that in today's Aerocast network content is streamed in the clear by network 100. Disadvantageously, because it is unprotected, the content may be intercepted by an unauthorized consumer resulting in substantial losses to content providers and consumers.

Other disadvantages of network 100 include a lack of authentication, privacy, message integrity and persistent protection.

Therefore, there is a need to resolve the aforementioned problems and the present invention meets this need.

BRIEF SUMMARY OF THE INVENTION

A digital rights management architecture for securely delivering content to authorized consumers, and for securely transferring data among various network components.

According to a first aspect of the present invention, this architecture includes a consumer system connected through an IP (Internet protocol) communication network to a content provider. The architecture further includes a KDC (key distribution center) and a caching server also coupled to the communication network. An authorized user may wish to access content from the content provider. The user employs consumer system for selecting the desired content from the content provider URL, for example. In turn, the content provider provides a session rights object to the consumer system, the session rights object for accessing the requested content. A session rights object may contain purchase options selected by the user. Or, it may contain content access rules. A purchase option characterizes content, i.e., whether it is free or subscription only, pay per view, and so forth. An example of a content access rule is no content access to areas outside designated geographical locations.

After the session rights object is received, the user is redirected to the caching server. From this caching server, requested content is streamed to the user. Note that the user may have previously obtained a caching server ticket from the KDC. A ticket is an authentication token and it may include the client, a server name, a session key, etc. The ticket further contains authorization data indicating subscribed services, user payment method, etc. This ticket and the session rights object are thereafter presented to the caching server which compares user selection and/or content access rules in the session rights object with authorization data from the ticket. If this information matches, content is streamed to the user. In this manner, an architecture is provided that securely provides content to authorized users while denying access to unauthorized users.

According to another aspect of this invention, a rights management architecture for securely delivering content to authorized consumers is taught. The architecture includes a content provider and a consumer system for requesting content from the content provider. The content provider generates a session rights object having purchase options selected by the consumer. A KDC thereafter provides authorization data to the consumer system. Also, a caching server is provided for comparing the purchase options with the authorization data. The caching server forwards the requested content to the consumer system if the purchase options match the authorization data. Note that the caching server employs real time streaming for securely forwarding the encrypted content, and the requested content is encrypted for forwarding to the consumer system. Further, the caching server and the consumer system exchange encrypted control messages (and authenticated) for supporting transfer of the requested content. In this manner, all interfaces between components are protected by encryption and/authenticated.

According to another aspect of the invention, a rights management method is used for securely pre-positioning content at a caching server. This method includes the steps of providing a content provider, a caching server and a key management protocol. This protocol employs various messages for securely transferring content. One message is a key request message sent from the content provider to the caching server. This message is for the purpose of initiating key management. Responsive thereof, a key reply message is sent from the caching server to the content provider. After, key request/key reply messages are exchanged, a set of keys for securely delivering content from the content provider to the caching server are established.

According to another aspect of the present invention, a protocol for securing data transfer between components of a communication network is disclosed. The protocol includes the step of providing a central server having a database. Next, content is published from a content provider to the central server. Further, the protocol includes the step of providing a billing center server, and reporting billing information from a caching server to the billing center server. Also, a provisioning database is provided, wherein the database is updated with consumer information. The protocol then uses a key management protocol to secure the data published to the central server. Also, data is secured when the billing information is reported and the provisioning database is updated.

Advantageously, the present invention blends public key technology and symmetric key approaches, achieving the best "software" implemented security for content distribution under the constraints of rapid acquisition time and minimal code complexity. Moreover, with the present architecture, network and service provider independent and capable of easy integration with a specific network.

Figure 1:
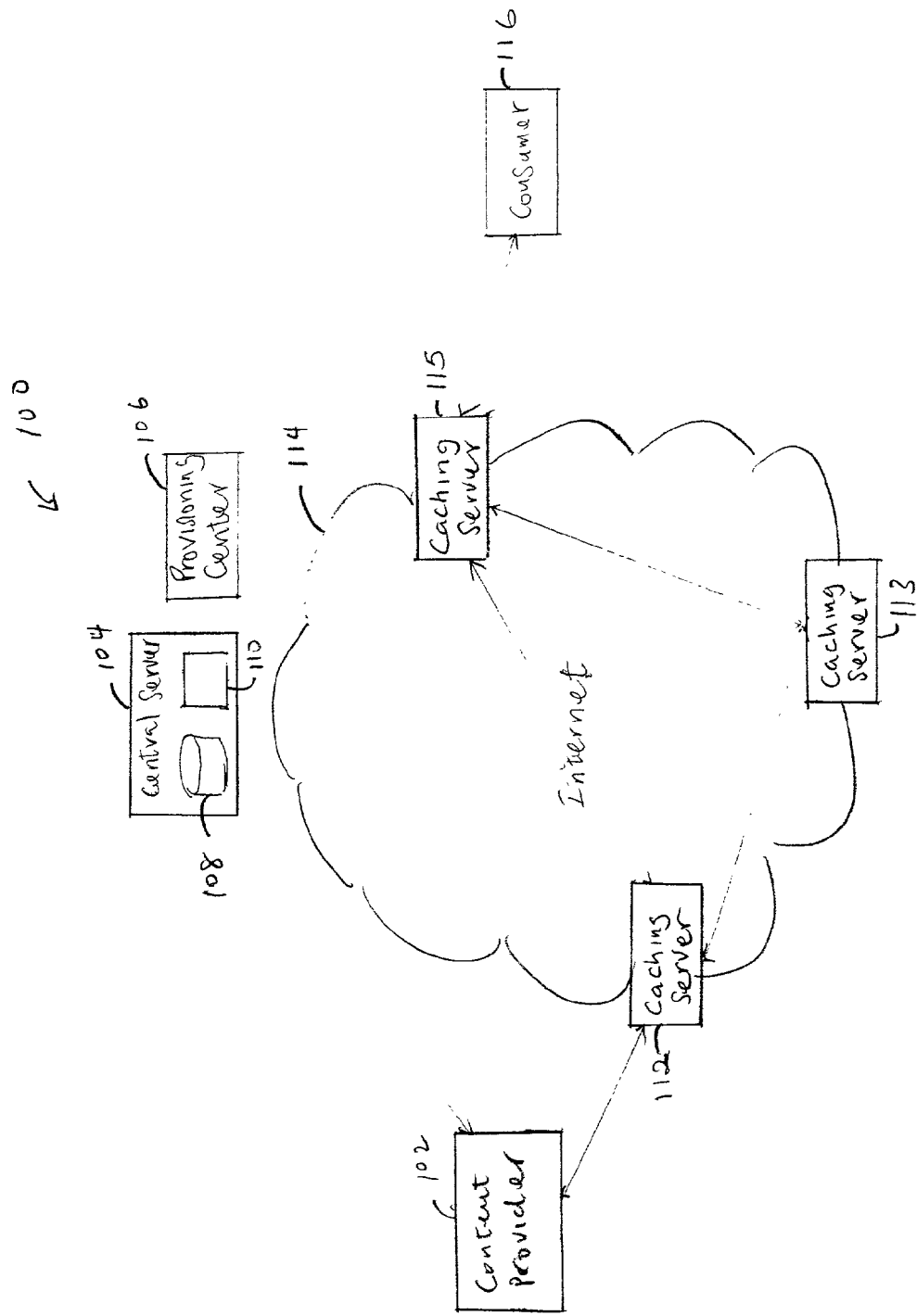
FIG. 1 is a block diagram of a network for facilitating streaming of content over a communication network.

A further understanding of the nature and advantages of the present invention herein may be realized by reference to the remaining portions of the specification and the attached drawings. References to "steps" of the present invention should not be construed as limited to "step plus function" means, and is not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Figure 2:
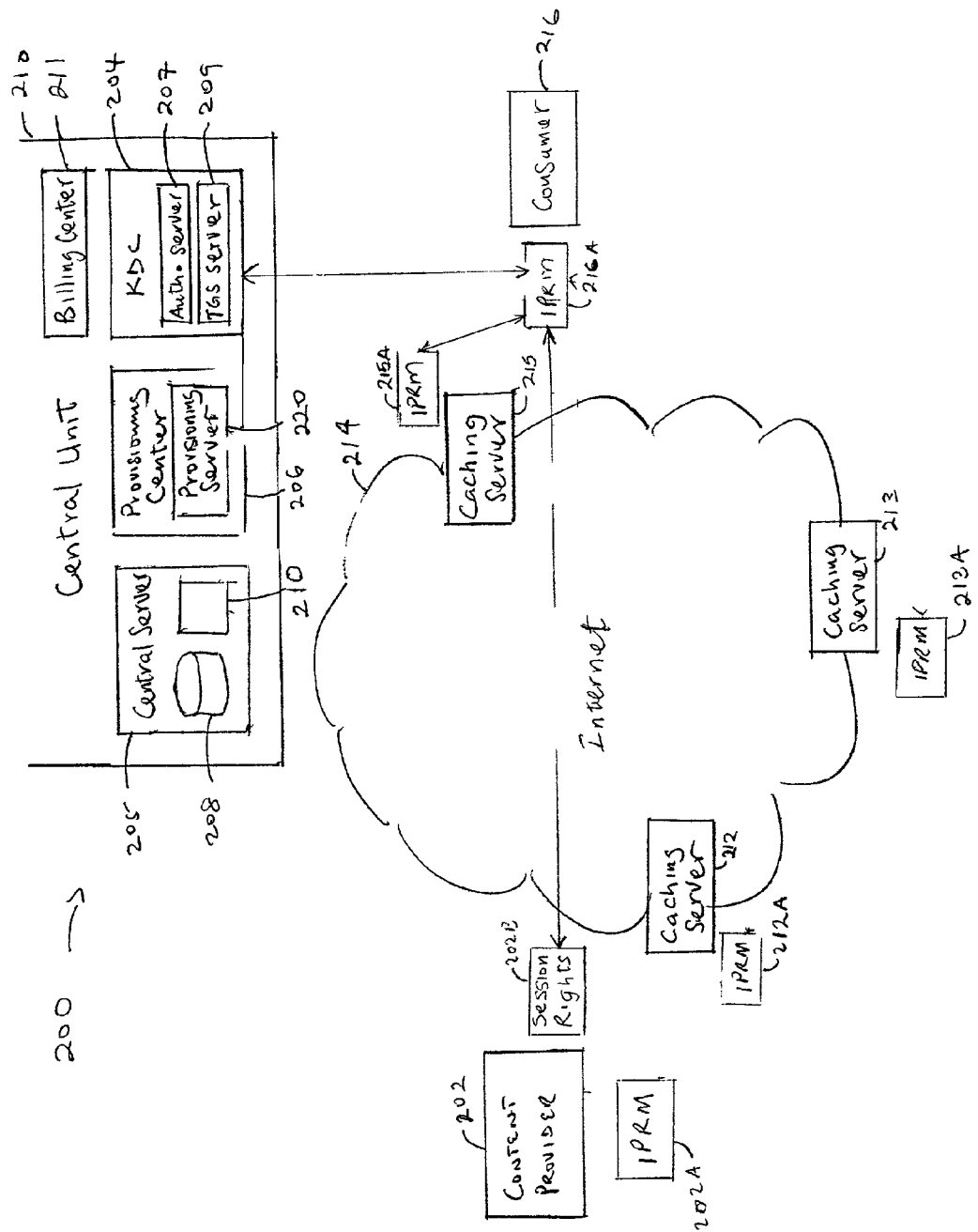
FIG. 2 is a block diagram of an IPRM (Internet protocol rights management) system incorporating the ES Broker™ protocol for applying key management and security to the network of FIG. 1 in accordance with an exemplary embodiment of the present invention.

FIG. 2 is a block diagram of an IPRM (Internet protocol rights management) system 200 incorporating the ESBroker™ protocol for applying key management and security to network 100 of FIG. 1 in accordance with an exemplary embodiment of the present invention.

Among other components, IPRM system 200 comprises a content provider 202, consumer 216, Internet 214, a provisioning center 206, a central server 205 that contains both a database 208 and a search engine 210, caching servers 212, 213 and 215 all of which function in a similar manner to those of the corresponding components in FIG. 1. In addition, IPRM system 200 comprises a KDC (key distribution center) 204 containing an AS (authentication server) 207 for issuing a TGT (ticket granting ticket) to consumer 216, a TGS (ticket granting server) 209 for providing server tickets to access particular servers, a provisioning server 220, and a billing center 211. KDC 204, billing center 211, provisioning center 206 and central server 205 are all located within a central unit 218 for facilitating provision of services within IPRM system 200.

Further, IPRM system 200 contains an IPRM agent 202A for administering rights management for content provider 202, a session rights object 202B for containing user selections and content rules, an IPRM agent 212A for administering rights management for caching server 212, IPRM agent 213A for administering rights management for caching server 213, IPRM agent 215A for administering rights management for caching server 215, IPRM agent 216A for administering rights management for consumer 216, and a viewer (not shown) within consumer 216 for receiving desired content. Although not shown, the foregoing components may be located within their associated components. For example, IPRM agent 202A is locatable within content provider 202 rather than externally as shown.

As noted, IPRM system 200 generally functions to facilitate streaming of content in a secure fashion, to consumer 216 by using caching servers 212, 213 and 215. Content provider 202 provides content only once and thereafter it can be moved among the caching servers. The reason for the caching servers are to move the content closer to the edges of IPRM system 200. This improves the streaming performance and allows smaller content providers to sell their content without the need to buy expensive hardware for media streaming. It also allows introduction of an IP multicast (communication between a single sender and multiple receivers on a network) only at the caching servers. With current technology it is easier to have an IP multicast limited to a local access network than to have an IP multicast over the Internet.

The present invention in accordance with a first embodiment provides security to IPRM system 200 via KDC 204, IPRM agents 202A, 212A, 213A, 215A, and 216A. The IPRM agents in conjunction with KDC 204 and provisioning center 206 provide authentication, privacy, integrity and access control tools to all aspects of IPRM system 200. For example, before a consumer can utilize the system for streaming content, a registration process is required. Secure registration for the consumer is provided by IPRM system 200. Thus, during the registration process, no one else may replicate the identity of consumer 216 by intercepting messages between consumer 216 and KDC 204. KDC 204 is a trusted entity and provides key distribution to network components using a blend of symmetric and asymmetric algorithms. These algorithms may be implemented by using one or more software instructions. Or, they may be provided in secure cryptographic hardware.

Another aspect of the system wherein security is provided is the interface between the caching servers and content provider 202, when content is communicated between the nodes. Other aspects to which security is provided are installation of caching servers, delivery of content to caching server from content providers, moving content between caching servers, reporting of usage data, billing, consumer profile update, content publishing; and initial consumer sign up. Although not indicated, one of ordinary skill in the art will realize that other aspects consistent with the spirit and scope of the present invention may be secured.

KDC 204 and the IPRM components may be purely software protection, with a limited trust placed upon consumer 216s, or may be hardware security modules, which may be mandatory to obtain rights to high quality content from copyright owners requiring high security levels, or may be a combination of both software and hardware. IPRM uses an authenticated key management protocol with high scalability to millions of consumers. The key management protocol is called ESBroker™ (Electronic Security Broker), a product of Motorola, Inc., San Diego Calif., will be referenced throughout this specification.

The ESBroker™ protocol partly based on the Kerberos framework consists of client interactions with the centralized Key Distribution Center (KDC 204) as well as with the individual application servers. A KDC client is any host that can send requests to the KDC. Within the IPRM system this includes consumers, caching servers and other IPRM system components. An application server is any server registered with the KDC for which a client might request a service ticket (e.g. caching server, Billing Center, etc.).

As used herein, a ticket is an authentication token that is given out to a client by the KDC. Among other information, a ticket contains the name of the client, name of a specific server and a session key (a symmetric encryption key). The client name and session key need to be kept secret and are encrypted with another key, called a service key. The service key is a secret key that is known only to the KDC and the server named in the ticket. Because the client does not also possess this service key, it does not have the ability to decrypt the ticket and change its contents. Normally, the client also needs to know the session key and since it cannot get it out of the ticket, the KDC sends to this client a separate copy of the same session key.

In order to authenticate a message with a ticket (e.g. ESBroker Key Request message), a client would include in this message both a ticket and a checksum value for the session key in the ticket. Note that the session key in the ticket is encrypted with the server's service key. When the server named in the ticket receives this message from the client, it is able to decrypt the ticket with its service key, verify the client name and obtain the session key. The session key is then subsequently used to verify the keyed checksum and thus authenticate the whole message.

This ticket-based authentication is part of the Kerberos IETF (Internet engineering task force) standard (RFC 1510) and is also utilized in the ESBroker protocol. It is also understood that other authentication techniques based on other standards may be employed. A ticket may have other information as well, including a validity period (start time and expiration time), various flags, client authorization data, etc. The authorization data field may contain subscribed services, geographical location, user payment method, and other data relevant to user authorization.

The same host may be both a KDC client and an application server at the same time. For the IPRM system 200, the protocol employs a series of messages to accomplish key management between client and server interfaces of the system. This key management protocol is intended to be of general use for establishing secure sessions and is not restricted to the IPRM system. These messages listed in Table 1 below, are further described in the section entitled IPRM Protocol Messages.

TABLE 1

| Code | Message Type | Description |
| --- | --- | --- |
| 1 | CLIENT_ENROLL_REQ | Client enrollment request, containing client public key and other attributes |
| 2 | CLIENT_ENROLL_REP | Client enrollment reply from KDC 204, possibly containing a client certificate for the public key. |
| 3 | AS_REQ | Request Ticket Granting Ticket from the Authentication Server |
| 4 | AS_REP | Reply from Authentication Server with the TGT |
| 5 | TGS_REQ | Request service ticket from TGS server 209 |
| 6 | TGS_REP | Reply from TGS server 209 with the service ticket |
| 7 | TKT_CHALLENGE | Server requests this client to initiate key management |
| 8 | KEY_REQ | Key Management request from client |
| 9 | KEY_REP | Key Management reply from the application server |
| 10 | SEC_ESTABLISHED | An ACK from client to an application server stating that security is established |
| 11 | ESB_ERR | Error reply message |
| 12 | INIT_PRINCIPAL_REQ | Create a Provisioning Ticket for a specified principal. If the specified principal doesn't already exist, it will be initialized in KDC 204 database. |
| 13 | INIT_PRINCIPAL_REP | Returns a Provisioning Ticket for the specified principal. |
| 14 | DELETE_PRINCIPAL_REQ | Delete a specified ESBroker ™ principal from KDC 204 database. |
| 15 | DELETE_PRINCIPAL_REP | Acknowledgment to DELETE_PRINCIPAL_REQ |
| 16 | SERVICE_KEY_REQ | Application server requests a new service key from KDC 204. |
| 17 | SERVICE_KEY_REP | KDC 204 returns a new service key to the application server. |
| 18 | AUTH_DATA_REQ | KDC 204 requests authorization data for a particular principal. This may be part or all of the authorization data that will appear in a ticket that KDC 204 subsequently issues. |
| 19 | AUTH_DATA_REP | Authorization Server returns the data requested with AUTH_DATA_REQ. |

In operation, the key management process between a client and a server is classified two phases: (1) a generic phase in which a client is in contact with KDC 204 to obtain a server ticket to access the server; and (2) a non-generic phase in which the client uses the server ticket to form a KEY_REQ (key request) message to the server. In the non-generic phase, a DOI (domain of interpretation) object containing information that is specific to a particular application of a general ESBroker key management protocol (e.g. specifically for the IPRM System). For example, in a key management process between consumer 216 (client) and caching server 215 (server), the generic phase involves obtaining, by consumer 216, a server ticket from KDC 204 for accessing caching server 215. The non-process involves using the server ticket to generate the KEY_REQ message for accessing caching server 215, wherein the KEY_REQ contains the DOI object that contains the Session Rights that contain user selection and optionally content rules. Typically, content rules may be restrictions to certain geographical regions, for example It should be noted that content rules are generally applicable to all users. Furthermore, which messages are used in the protocol depend on whether key management is client or server initiated. If server initiated, the TKT_CHALLENGE (ticket challenge) message may be employed in addition to other messages as more clearly shown with reference to FIG. 4.

Figure 3:
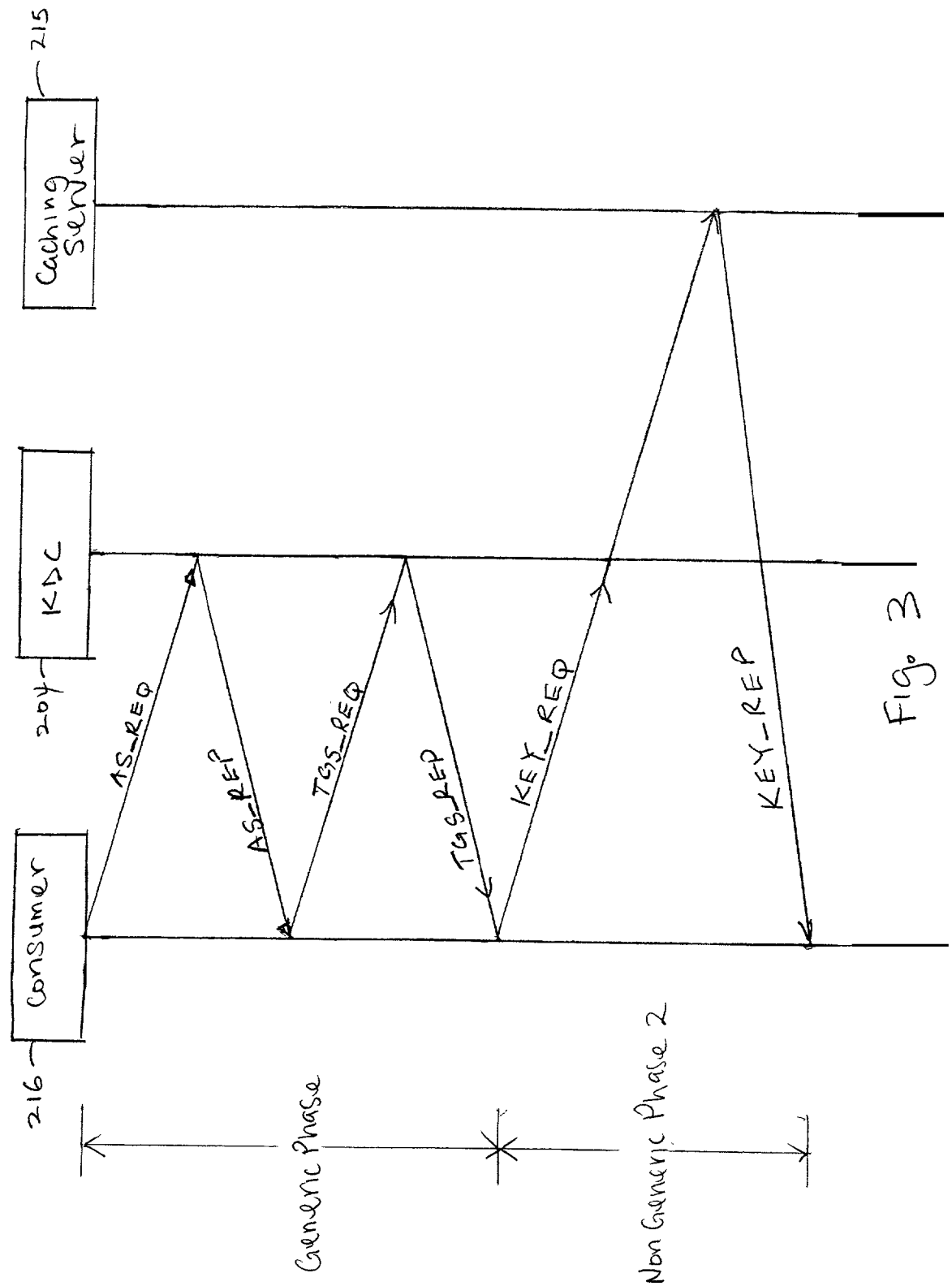
FIG. 3 is a high-level flow diagram of the security and key management protocol when key management is initiated by a consumer (client) to a caching server (server) in accordance with an exemplary embodiment of the present invention.

FIG. 3 is a high-level flow diagram of the security and key management protocol when key management is initiated by consumer 216 (client) to caching server 215 (server) in accordance with an exemplary embodiment of the present invention.

As shown, consumer 216 wishing to stream content from caching server 215 in a secure manner initiates the key management process. This is done by transmitting an AS_REQ message to KDC 204 to obtain a TGT (ticket granting ticket) for TGS server 209. The AS_REQ message contains the consumer 216's identity, KDC 204's identity, more specifically the KDC realm or administrative domain, and a nonce to tie it to a response. It may also contain a list of symmetric encryption algorithms that are supported by consumer 216. Of course, it is assumed that both consumer 216 and caching server 215 have been registered by KDC 204 which acts as a trusted authenticator and can verify the identity of both nodes.

As shown, in response to the AS_REQ message, KDC 204 validates the TGT request, checks with provisioning server 220 for validity of consumer 216 and thereafter responds with an AS_REP message containing the TGT. It should be noted that the private portion of the TGT is encrypted with KDC 204's service key known only to KDC 204. The same KDC 204 service key is also used to authenticate the TGT with a keyed hash. Since consumer 216 does not know KDC 204 service key, it cannot modify it and cannot read the private part of the ticket. Because consumer 216 still needs to know the session key for subsequent authentication to KDC 204, another copy of the session key is delivered to consumer 216 using a key agreement algorithm (e.g., Elliptic Curve Diffie-Hellman).

After receiving and storing the TGT, consumer 216 is ready to start requesting streaming content on this network. A TGS_REQ message containing the TGT is sent to KDC 204 (TGS server 209) requesting a ticket for caching server 215. It should be noted that consumer 216 might perform additional provisioning actions, such as subscribe to a particular content provider. Also, consumer 216 may create a list of preferred caching servers.

Responsive to the TGS_REQ message, a TGS_REP message having the caching server ticket is transmitted to consumer 216 from KDC 204. If there are additional preferred caching servers, consumer 216 may contact KDC 204 to obtain caching server tickets for the preferred caching servers using the TGT. These caching server tickets may then be cached for later use. Otherwise, the caching server tickets are obtained at the time of requesting the content from the appropriate caching server.

For some consumers, KDC 204 first needs to query provisioning server 220 for subscriber authorization data before issuing the caching server tickets. This is accomplished with an AUTH_DATA_REQ/AUTH_DATA_REP exchange between KDC 204 and the provisioning server 220. The user authorization data is insertable into the tickets. The caching server ticket has the same format as the TGT—it includes a session key used for authentication to the caching server 215. The private part of the ticket is encrypted with caching server 215's service key known only to it and KDC 204. The ticket is also authenticated with a hash that is keyed with the same service key. As is the case with the TGT, consumer 216 is not able to modify this ticket. Consumer 216 needs the session key from the caching server ticket to authenticate itself to this server. A copy of this session key is delivered to consumer 216, encrypted with the TGT session key.

This process beginning with the AS_REQ message to the TGS_REP message corresponds to the generic phase noted above wherein a client is in contact with KDC 204 to obtain a server ticket to access the server. Because it is generic, the same process is used to secure other interfaces for delivery of content from content provider to caching servers; reporting of usage; billing, etc. Further, this results in a more secure IPRM system without the need for unnecessary or complex options. Moreover, because of the reduction in complexity, problems are identified and rectified in an expeditious fashion.

Upon receiving the TGS_REP message containing the caching server ticket, a KEY_REQ message with the ticket is sent to caching server 215. The KEY_REQ message contains a MAC (message authentication code) of the message, DOI (domain of interpretation) object and a time stamp in addition to the caching server ticket. A DOI object is for carrying application specific information associated with this secure session. In the present embodiment, the DOI object contains session rights information for consumer 216. The session rights are provided by content provider 202. The reason for encapsulating the session rights into this DOI object is because the session rights are specific to this particular content delivery architecture (with caching servers), while the ESBroker protocol provides generic key management services. ESBroker could be applied to other types of secure sessions, with their application-specific information also encapsulated in the DOI object.

When caching server 215 receives the generic KEY_REQ message, it extracts the non-generic DOI object. Caching server 215 then checks application specific code for streaming, for example, verifies the DOI object, and authorization information. If the session rights matches the authorization data in the ticket, a KEY_REP message containing a session key is forwarded to consumer 216. Note that authorization data comes from the ticket and that session rights object contain user selections and/or content rules. User selection is compared against the authorization data and against the content rules. If the content rules were not inside the session rights object, the caching server must have obtained them from the content provider using some other method. Further, there may be some content rules coming from other sources e.g. a cable provider.

When the session rights match the authorization data, from that point, both sides have a protocol key and can start encrypting their final messages such as streaming content. If authorization fails, an error message is forwarded to the consumer. It should be noted that in some instances, the KEY_REP message contains a generic DOI object where caching server 215 needs to return some application specific information to consumer 216. For example, in the IPRM system, when the caching server sends a Ticket Challenge to the content provider to request a secure session, the session ID is provided later by the caching server, inside the DOI object in the KEY_REP message. The Ticket Challenge message is not authenticated and therefore does not contain a DOI object.

This phase (KEY_REQ/KEY_REP) corresponds to the non-generic phase in which the client uses the server ticket to form a key request to the server. This phase is non-generic because the DOI object varies depending on the interface being secured. For example, the DOI object relating to delivery of content from content provider to caching servers is different from that employed for delivery of the same content from a caching server to subscribers.

Figure 4:
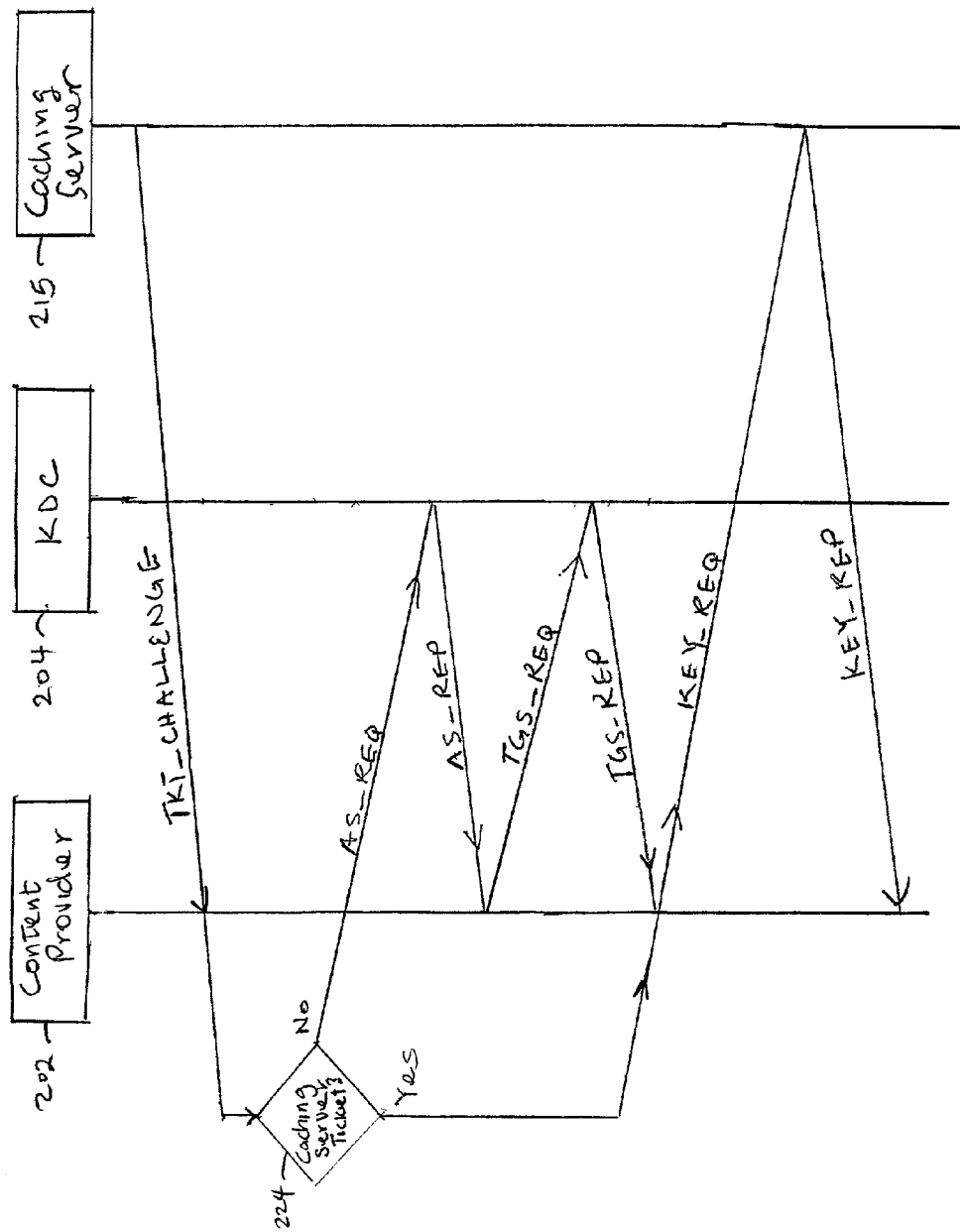
FIG. 4 is a high-level flow diagram of the security and key management protocol when key management is initiated from a caching server (server) to a content provider (client) in accordance with an exemplary embodiment of the present invention.

FIG. 4 is a high-level flow diagram of the security and a possible key management protocol when key management is initiated from caching server 215 (server) to content provider 202 (client) in accordance with an exemplary embodiment of the present invention. Note that a caching server may also initiate key management with the content provider using a Key Request message as illustrated on FIG. 3. The method shown on FIG. 4 provides an optimization for server-initiated key management, eliminating the need for a server to obtain and then cache potentially large numbers of client tickets.

Key management is initiated by caching server 215 when a request for content is received and caching server 215 does not have the requested content. As shown, key management may be initiated by sending a TKT_CHALLENGE (ticket challenge) message from the caching server 215 to content provider 202. The TKT_CHALLENGE is for use by a server to direct a client to initiate key management.

At decision block 224, if content provider 202 has a previously obtained caching server ticket, it forwards a KEY_REQ message containing the ticket to caching server 215. In response, caching server 215 sends a KEY_REP message as previously discussed above. On the other hand, returning to decision block 224, if content provider 202 has no caching server ticket and no TGT, it sends an AS_REQ message to KDC 204 which replies with an AS_REP message. If the content provider has its TGT the AS_REQ/REP is skipped.

Thereafter, content provider 202 sends a TGS_REQ message to KDC 204, and receives a TGS_REP message containing the caching server ticket. When the caching ticket is obtained, content provider 202 sends a KEY_REQ message in this case with no DOI object. The session ID may be either in the reply or the request or both; session rights don't apply since neither content provider 202 nor caching server 215 is a consumer. Once the shared key is established, SEC_ESTABLISHED message (not shown) is sent to caching server 215 by content provider 202. Since the server initiated key management, the SEC_ESTABLISHED message informs the server that security has been established.

Advantageously, it should be observed that the same messages namely TKT_CHALLENGE, AS_REQ/AS_REP, TGS_REQ/TGS_REP, KEY_REQ/KEY_REP, SECURITY_ESTABLISHED are used in multiple protocols and scenarios depending on whether a client or server initiates key management. If the server requests key management, all of the messages may be used including the TKT_CHALLENGE message. Contrawise, if the client initiates key management all messages other than the TKT_CHALLENGE are employed. It should be observed that the Security Established message is also commonly skipped when client initiates key management. Advantageously, because a single key management protocol is utilized on all interfaces, it is easier to analyze whether the system is secure. In addition, the system secures both streaming content and non-streaming content including billing data with the same key management with changes only to the DOI object field.

Figure 5:
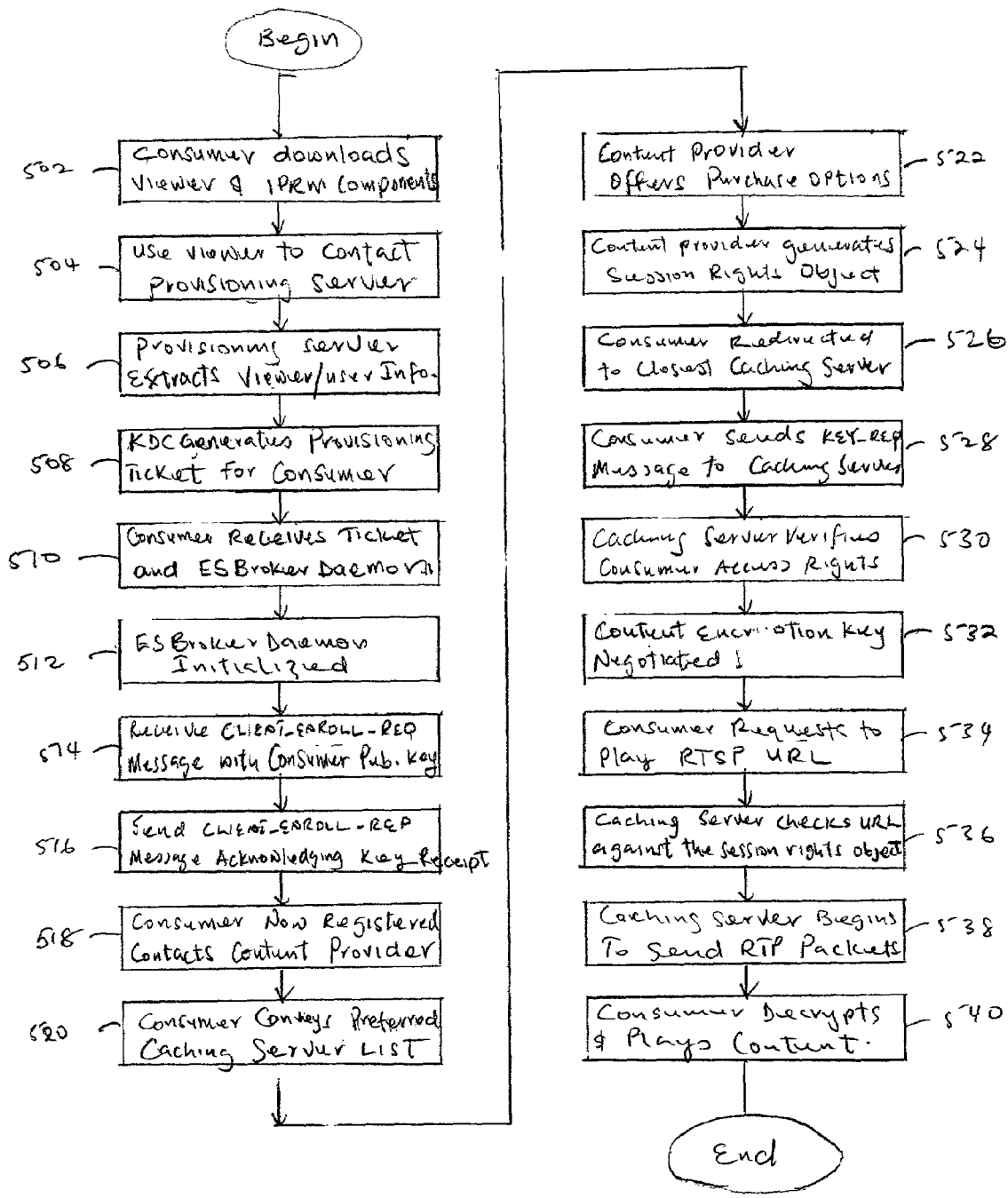
FIG. 5 is a block diagram illustrating initial registration and the receipt of content by a consumer in accordance with an exemplary embodiment of the present invention.

FIG. 5 is a block diagram illustrating initial registration and the receipt of content by consumer 216 in accordance with an exemplary embodiment of the present invention.

A new consumer 216 wishing to receive content from caching server 215 may initially sign up with central unit 218.

At block 502, consumer 216 using a web browser accesses a web site (not shown) provided by central unit 218. Consumer 216 comes to the initial sign-up and software download page, downloads and installs a viewer application, including any IPRM components. Alternatively, the viewer application and IPRM components could be distributed to consumers with removable media, such as a CD-ROM.

At block 504, consumer 216 starts up the viewer to initiate an SSL (secured socket layer) session with provisioning server 220. The session is initiated using a central unit 218 certificate (not shown). The certificate is the signed public key of the central unit 218 previously obtained by consumer 216. After the SSL session begins, consumer 216 fills out the initial signup form, which includes a form for a user ID. Or, the user ID can be automatically assigned by the central unit. Consumer 216 next determines a local host identifier and sends it to provisioning server 220 along with other information. (This is done transparently by the viewer).

At block 506, provisioning server 220 extracts the user ID and converts it to an ESBroker™ principal name. A principal name is a uniquely named consumer or server instance that participates in IPRM system 200. In this case, the viewer principal name is the same as a subscriber id assigned to that viewer. After the user ID is converted to an ESBroker™ principal name, provisioning server 220 sends a command to KDC 204 to generate a new ESBroker™ principal in KDC 204 database (not shown). This command also includes a consumer host identifier.

At block 508, KDC 204 generates a provisioning ticket containing a provisioning key (session key) for consumer 216. The provisioning key may be a symmetric key in one embodiment of the present invention. The provisioning key is used by KDC 204 for authentication of messages between itself and consumer 216. Thereafter, the provisioning ticket is returned to provisioning server 220 along with an SKS (Session Key Seed). Because consumer 216 has no access to the provisioning key (encrypted with a KDC 204 key), the SKS is used by consumer 216 to reconstruct the provisioning key located within the provisioning ticket.

At block 510, in addition to the provisioning ticket, configuration parameters including the user ID, ticket expiration time (already included in the non-encrypted part of the ticket), KDC 204 name and/or address etc. and (optionally) software components including an ESBroker™ daemon are downloaded by consumer 216. It should be observed that the software components might have been downloaded previous to this registration procedure, as is the case in the Aerocast network.) Thereafter, the SSL connection is terminated.

At block 512, the ESBroker™ daemon is initialized using the downloaded configuration parameters.

At block 514, a public/private key pair for authenticating AS_REQ messages between consumer 216 and KDC 204 is generated. The public key is forwarded to KDC 204 from consumer 216. This is accomplished using a CLIENT_ENROLL_REQ message. The message contains the public key (symmetrically) signed with the provisioning key derived from the SKS by consumer 216. Since there is no access to the provisioning key within the provisioning ticket, consumer 216 derives the provisioning key from the SKS using a one-way function. The problem with distributing tickets and provisioning keys to software clients is that a software client may copy the ticket and key for forwarding to an unauthorized software client. To address this problem, consumer 216 receives the SKS instead of the actual provisioning key. Combining SKS with a unique host identifier using a one-way function generates the provisioning key. The SKS is specific to a particular host and can't be used anywhere else. In the present embodiment, consumer 216 executes the following function to reproduce the provisioning key:

Provisioning key=$SKGen^{-1}$ (Host ID, SKS)

Where $SKGen^{-1}( )$ is a one-way function; $SKGen^{-1}( )$ cannot be calculated within reasonable amount of time (e.g. in less than the ticket lifetime).

At block 516, upon receiving the CLIENT_ENROLL_REQ message, KDC 204 finds consumer 216 in its local database to verify the request. If the request is valid, KDC 204 stores the public key either in a client database that could be located locally on the KDC or at some other remote location with secure access. Alternatively, KDC 204 may generate a certificate with the public key for forwarding to consumer 216. A message CLIENT_ENROLL_REP acknowledging the key has been stored (or alternatively containing a client certificate) is then forwarded to consumer 216.

At block 518, consumer 216 is now enrolled and may contact a web site (not shown) with a database 208 having a listing a content from various providers including content provider 202. When the desired content is located, consumer 216 gets redirected to content provider 202.

At block 520, consumer 216 then contacts content provider 202 to which it was redirected and conveys its preferred list of caching servers, list of subscribed services, its ability to pay for content, etc.

At block 522, content provider 202 offers an optimized subset of purchase options that depend upon the context of the particular consumer and service. For example, price selection screens may be bypassed for consumers already subscribed to this service.

At block 524, content provider 202 generates a session rights object that encapsulates the purchase options selected by consumer 216, an optional set of content access rules (e.g., blackout regions) and a reference to the selected content. For example, a session ID which is a random number that was generated by consumer 216 when it requested these session rights from the content provider. The session rights object may have an end time after which these session rights are no longer valid, a ProviderID, etc. Optionally, session rights objects may content rules. Alternatively, these rules may be delivered to a caching server using some out of band method.

At block 526, content provider 202 redirects consumer 216 to the appropriate caching server. In this case, content will be streamed from caching server 215 which is closest to consumer 216. If consumer 216 had previously cached a caching server ticket for caching server 215 when it signed up, it retrieves that ticket. If it has no cached ticket, it contacts KDC 204 using a TGT to obtain the correct caching server ticket.

At block 528, consumer 216 authenticates itself to caching server 215 using the caching server ticket, and at the same time (in the same KEY_REQ message) forwards the session rights object obtained from content provider 202 to caching server 215. Communication between consumer 216 and caching server 215 is accomplished using the KEY_REQ/KEY_REP messages, above.

At block 530, caching server 215 checks the access rules from the session rights object against consumer 216's entitlements contained in the ticket and also against the user selection (purchase option selected by the consumer) in the session rights object The entitlements are basically authorization data specific to consumer 216 which allows access to content. The set of content access rules is optional because it might have been delivered directly to caching server 215 with the content. Furthermore, caching server 215 can optionally gather additional content access rules from multiple sources. For example, an access network provider (e.g. cable system operator) might impose some restrictions for delivery over its network.

At block 532, if access is approved, consumer 216 and caching server 215 negotiate a Content Encryption Key (CEK) for delivery of the content.

At block 534, consumer 216 starts issuing encrypted RTSP commands to the caching server 215 to get description of the content (RTSP URL) and then to request to play the content.

At block 536, caching server 215 receives RTSP commands, decodes them and returns encrypted RTSP responses. When an RTSP command requests to play a specific URL, caching server 215 verifies that the specified URL is what was specified in the session rights object for this secure session (identified by a Session ID).

At block 538, after receiving a request to play an RTSP URL, caching server 215 begins to send out encrypted RTP packets and both caching server 215 and consumer 216 periodically send encrypted RTCP report packets. All RTP and RTCP packets associated with the same RTSP URL are encrypted using the same Session ID, the Session ID that was recorded when caching server 215 started receiving encrypted RTSP messages from consumer 216.

At block 540, consumer 216 decrypts and plays the content. At the same time, consumer 216 may issue additional RTSP commands (e.g. to pause or resume content play out), still encrypted using the same Session ID. Caching server 215 keeps track of who viewed the content, how long the content was viewed, and under what mechanism the content was purchased. This information is then used for billing purposes, whether directed to consumer 216 or to the advertiser. Advantageously, the present system allows an effortless transition through multiple content from various providers and with billing information such as a credit number entered only once. When content is requested, information about consumer is being transmitted transparently to the content provider. The consumer experience is relatively effortless because multiple access codes need not be remembered.

Publishing Content

When content provider 202 desires to publish content to central server 205, the same protocol steps described above are used. For example, central server 205 establishes security associations with content provider 202 by sending it a KEY_REQ message, followed by KEY_REP as described above.

Delivery of Content Between Caching Servers

The caching server requiring content initiates the authentication and key delivery process by providing the source caching server ticket. If it does not already possess this ticket, it requests it from KDC 204 using its TGT.

Reporting of Billing Data

When KDC 204 issues consumer 216 a service ticket for a caching server, i.e. caching server 215, it adds consumer authorization data, e.g., subscription data and allowable purchase options to that ticket. Based on consumer 216 authorization data and the secure object generated by content provider 202 and forwarded by consumer 216, caching server 215 will grant access to the content to consumer 216 and record the usage and purchase information. Periodically, caching server will contact the billing center 211 to report the billing information. The caching server will authenticate itself to the billing center 211 using the billing center ticket. Once authentication is complete, the caching server securely transfers the recorded billing information to the billing center 211. Billing center 211 may retrieve consumer data (billing address, credit card, etc.) from a consumer database maintained by the Provisioning Center. Central unit 218 may do billing via a co-located Billing System, or interface with a Billing System residing at a local network operator or content provider site.

Initial Installation of Caching Servers

Generally, caching server 215 gets provisioned using a similar mechanism described above except that a SERVICE-_KEY_REQ/SERVICE_KEY_REQ for initially obtaining and then later updating its service key. This allows for automatic, scheduled updates to the service keys, thus lowering a chance that a particular service key may be compromised.

Streaming and Non-Streaming Content

There are two basic categories of content that are protected: streaming and non-streaming content. The following protocols are used to deliver either the actual streaming content or information related to the content: Streaming Content: RTP (real time protocol)/RTCP (real time control protocol), RTSP (real time streaming protocol). Non-streaming transfer of content between servers: Streaming Description: RTSP with SDP (session description protocol). Other Non-Streaming Content: HTTP (provisioning, content publishing to the directory); Custom protocols over either TCP (transport control protocol) or UDP (user datagram protocol) (content usage reporting). Streaming Content. In standards-based systems, the streaming content is typically delivered using the RTP. There are additional proprietary streaming protocols such as Real and Microsoft's Windows Media that can also be secured with this IPRM system.

RTP Security Services

Authentication, encryption and message integrity are implemented to ensure that unauthorized parties are unable to view paid content.

RTP Cryptographic Mechanisms

Each media RTP packet is encrypted for privacy. The two end-points have an ability to negotiate a particular encryption algorithm as defined by the system configuration and controlled by the server. Encryption is applied to the packet's payload. The RTP header has the RFC-1889 format. The first twelve octets are present in every RTP packet, while the list of CSRC identifiers is present only when inserted by a mixer.

RTP Packet Encoding

Each packet may be encoded using the following procedure: The sender looks up the Session ID for this packet. The lookup could be based on the SSRC (RTP Synchronization Source) or on the destination IP address and UDP port. (In the case of point-to-point delivery, the Session ID is a random number, unique at both endpoints of the connection.) The Session ID in turn identifies a set of security parameters for encrypting this packet. These parameters are: (1) EK—RTP encryption key. This encryption key is only used to encrypt traffic in one direction (e.g., always from the Caching Server to its consumer 216s). In the IPRM system there are bi-directional RTP sessions and therefore there is only one RTP encryption key per session. (2) a 16-byte Initialization Vector (IV). In a first aspect, the packet body, not including the RTP header is encrypted using the selected block cipher in CBC mode. In one embodiment, the AES (Advanced Encryption Standard) cipher is used. AES operates on 128-bit blocks. If the last block is shorter than that, special processing may be used to encrypt it, called RBT (Residual Block Termination).

RTP Packet Decoding

Each packet is decoded using the following procedure: The receiver looks up the Session ID for this packet. The lookup could be based on the SSRC (RTP Synchronization Source) or on the source IP address and UDP port. (In the case of point-to-point delivery, the Session ID is a random number, unique at both endpoints of the connection.) The Session ID in turn identifies a set of security parameters for decrypting this packet. These parameters are: EK—RTP encryption key; an Initialization Vector (IV), which is derived from the RTP packet header using a one-way function. It should be observed that because each RTP packet header contains a different sequence number or timestamp, it results in a unique IV per packet.

RTCP Packet Encoding

An encoded RTCP packet contains the original encrypted RTCP packet plus some additional fields:

Secure session identifier

Packet sequence number

IV (Initialization Vector), needed only when the selected encryption algorithm is a block cipher in CBC (Cipher Block Chaining) mode MAC—Message Authentication Code to provide message integrity Each packet is encoded using the following procedure: The source IP address and UDP port are used to look up the Session ID for this packet. (In the case of point-to-point delivery, the Session ID is a random number, unique for both endpoints of the connection.) The Session ID in turn identifies a set of security parameters for encrypting this packet. These parameters are: EK—media stream encryption key (same as for RTP), $K_{MAC}$—message authentication key.

Next, determine the sequence number. It is 0 for the first RTCP message sent with the current security parameters and incremented by 1 after that. Next, generate a random Initialization Vector (IV) with the size the same as the cipher block size. Next, encrypt the RTCP message, using the selected block cipher in CBC mode. Currently, AES cipher may be used. AES operates on 128-bit blocks. If the last block is shorter than that, special processing Is used to encrypt it, called RBT (Residual Block Termination). Thereafter, put together the encoded RTCP message with the exception of the MAC, and calculate the MAC over the RTCP message and append it to the same message.

RTCP Packet Decoding

Each packet Is decoded using the following procedure: The Session ID in the header is used to look up a set of security parameters for decrypting this packet. These parameters are: EK—media stream encryption key (same as for RTP) $K_{MAC}$—message authentication key Calculate a MAC over the encoded message, not including the MAC field itself. Verify that the calculated MAC matches the value in the encoded message. If they don't match, abort further decoding and report an error. Verify the sequence number as specified in the subsection below. If verification fails, the message is rejected as a replay. Decrypt the encrypted RTCP message, using the selected block cipher in CBC mode. The IV for this message is included in the encoded message.

Sequence Number Verification

There are two cases for sequence number verification: when the message is received via UDP and when it is received via TCP. Although RTCP messages are always sent over UDP, the same message decoding rules apply to protocols other than RTCP.

Sequence Number Verification for Application Messages Sent Over TCP.

The sequence number of a received message is greater than the sequence number of the previously received message. The receiver accepts a message when the sequence number had increased by more than one from the previous message. (This scenario might occur if the receiver's internal buffer were to overflow and lose some incoming messages before that were processed.)

Sequence Number Verification for Application Messages Sent Over UDP.

The sequence number is verified using a sliding window protocol: The size of the sliding window W depends on the reliability of the UDP transport and is locally configured at each endpoint. The parameter W may be 32 or 64. The sliding window is most efficiently implemented with a bit mask and bit shift operations. Before the receiver processes the first packet in a UDP stream from a secure session, the first sequence number in the sliding window is initialized to 0 and the last one is W−1. All sequence numbers within the window are accepted the first time but are rejected when they are repeated. All sequence numbers that are smaller than the "left" edge of the window are be rejected. When an authenticated packet with a sequence number that is larger than the "right" edge of the window is received, that sequence number is accepted and the "right" edge of the window is replaced with this sequence number. The "left" edge of the window is updated in order to maintain the same window size. When for a window $(S_{RIGHT}-W+1, S_{RIGHT})$, sequence number $S_{NEW}$ is received and $S_{NEW} > S_{RIGHT}$, then the new window becomes:

$(S_{NEW}-W_{RTCP}+1, S_{NEW})$

RTSP Encoding

If encoded RTSP messages are directly received by a proxy that immediately decodes them, they may be encoded in binary. However, if RTSP messages are forwarded by some intermediate HTTP relay agent, they may be printable ASCII-encoded. The binary encoding of the RTSP messages is identical to that of the encoding of RTCP messages. In the case that a printable ASCII encoding is required, the RTSP binary encoding is then base-64 encoded. An RTSP Packet is encoded as follows: Create a binary encoding using a procedure identical to the one for RTCP packets. If printable ASCII is required, base-64 encode the binary encoding. Insert a <CR><LF> after each 80 characters of the base-64 encoding. If the last line is less than 80 characters long, append another <CR><LF> at the end.

RTSP Message Decoding

Each encoded RTSP Message is decoded as follows: If the RTSP message is base-64 encoded, first remove the <CR><LF> characters and then base-64 decode the ASCII message into a binary encoding. Decode the binary encoding exactly the same as for an RTCP packet, above. In some cases, a client (e.g. viewer) is required to obtain the Session Rights for receiving this content from a $3^{rd}$ party (the Origin Server). In these cases, the client would have passed its Session Rights for the content inside the DOI Object in the Key Request message. For point-to-point delivery, the RTSP protocol itself is generally used to request the streaming of a particular content, identified with an RTSP URL. The RTSP client software should verify that the RTSP URL requested with a secure RTSP message does in fact correspond to the RTSP URL in the Session Rights associated with that secure session (identified with a Session ID).

IPRM Protocol Messages

The following are further discussions of the protocol messages listed in Table 1.

Message AS_REQ

The message AS_REQ is sent to the ESBroker™ authenticating server (KDC 204) to obtain the Ticket Granting Ticket, which is used by a KDC client to request Tickets from servers. The message contains client's identity, server's identity, and a list of symmetric encryption algorithms that are supported by this client. To check against replays, this message also contains a timestamp. A signature is provided for message integrity. The signature may be a keyed checksum (e.g. HMAC) or a digital signature. Digital certificates can be optionally included in this message and may be utilized instead of the stored public keys in future phases to verify digital signatures. Client's permanent symmetric key for verifying a keyed checksum may be kept in the same user database. The message also includes public key info that is necessary for key agreement (e.g. Elliptic Curve Diffie-Hellman parameters).

Message AS_REP

AS_REP is generated in response to AS_REQ by KDC 204. KDC 204 looks up for the server and client's keys in the database and generates a session key, for subsequent authentication with KDC 204. KDC 204 generates a Ticket Granting Ticket, which has both a clear and an encrypted part. The server's identity in the TGT must always be 'KDC' (without quotes) and the KDC realm is listed separately in the server realm (Srealm) field of the AS_REQ message. The server's identity and the ticket validity period are provided in the clear inside the issued ticket. The encrypted part of the ticket contains client's name, session key and any other data that has to be private. The ticket also provides a list of encryption types and checksum types supported by KDC 204. The encrypted part of the ticket is encrypted using KDC 204's secret key. The message is signed by KDC 204 using the private key corresponding to the public key that was specified by the client in the AS_REQ and using the signing algorithm specified in the AS_REQ. The public key info is KDC 204's public part of the key agreement parameters and indicates the same key agreement algorithm as the one selected by the client. The public key to verify KDC 204's digital signature may be obtained by its clients during provisioning.

Encrypted Part of AS_REP

The encrypted part of the message contains the same information as is in the ticket so that client has access to its own authorization-data. It also contains client's identity to verify that this reply was originally constructed by KDC 204 for this particular client. The data is encrypted with a symmetric key derived from the key agreement algorithm. The key inside the encrypted part of AS_REP is not the same, however, as the Session Key in the ticket. It is instead an SKS—Session Key Seed that the client will use in combination with its Host ID to produce the actual session key.

Message TGS_REQ

A client initiates the TGS exchange between a client and the Ticket-Granting Server when it wishes to obtain authentication credentials for a given server. Client may already have acquired a ticket for the Ticket-Granting Service using the AS exchange. The message format for the TGS exchange is similar to that for the AS exchange. The primary difference is that encryption and decryption in the TGS exchange does not take place under a key agreement algorithm. Instead, the session key from the ticket-granting ticket is used. This message is sent by a client to the ticket granting server to obtain a caching server ticket (that can be used in an KEY_REQ). A client presents the TGT obtained from AS_REP as part of the message. The message specifies the server's identity as well as client's identity (which is inside the TGT). Client privacy is protected as his identity is encrypted inside TGT (within the IPRM system this feature is useful for consumer 216). A snooper is unable to detect which services the user is requesting. The server uses client's timestamp to detect replays. The session key in the TGT is used for the calculation of the checksum over the message.

Message TGS_REP

The TGS_REP message is generated in response to TGS_REQ by KDC 204. It contains the end service ticket (issued by KDC 204, which client presents to the server when it has to request a service. The server's identity and the ticket validity period are provided in the clear inside the issued ticket. The encrypted part of the ticket contains client's realm, client's name, and session key encrypted with a key shared by server and KDC 204. Any additional client data that needs to be private is included as part of the encrypted part of the ticket. The encrypted part of the message contains the SKS (in the session key field), which can be used by a client (along with the Host ID) to generate the actual session key that may be used to authenticate to a specified application server. The encrypted part of the message may also include client authorization data that is to be presented to the server. The message is signed by KDC 204 with a keyed checksum using the TGT session key. IPRM System 2000 currently utilizes the authorization data in tickets issued to consumers 216.

Message Ticket Challenge

The server utilizes the Ticket Challenge message whenever it wants to initiate key management. This message is not authenticated, but it does contain a STID in its header ( ). As used herein, an STID (Source Transaction Identifier) is a unique random value chosen by the initiator of a key management message.

Client's response will include the value of this STID in the DTID header field of the reply. Even without authentication, this prevents denial of service attacks where an adversary is able to trigger unwanted key management exchanges. This message also contains the server realm and principal name, used by a client to find or to obtain a correct ticket for that server. Within the IPRM system 2000, an application server initiates key management with a Ticket Challenge on the interface between a Content Provider (client) and a Caching Server (application server). The Ticket Challenge message also includes the following fields:

Identifier for the target protocol for which keys are being established

Application role—identifies a specific application for which keys are being established. When a key manager process receives a request from another host to establish keys, it will use the application role to find a local application to which to hand off the established keys and which will validate the contents of the DOI object.

Application server name and realm

Message Key Request

The Key Request is sent by a client in order to establish a new set of security parameters. Any time a client receives a Ticket Challenge message, it may respond with a Key Request. A client can also use this message to periodically establish new keys with the server. A client starts out with a valid ticket, previously obtained in a TGS Reply. The server starts out with its Service Key that it can use to decrypt and validate tickets. The Key request includes client ticket and keyed checksum needed to authenticate the client. The message also contains a timestamp (to prevent replay attacks). The message includes the following fields:

Identifier for the target protocol for which keys are being established.

Application role—identifies a specific application for which keys are being established.

Current time of the client's host

The service ticket obtained from the TGS_REP used to identify the client.

A list of cryptographic algorithms (ciphersuites) supported by the client.

DOI data that is protocol-specific and application-specific and may be encrypted.

An authenticator verifying the contents of the DOI data, where as this authenticator is generated by a $3^{rd}$ party (e.g., content provider).

Client-generated MAC for providing message integrity.

Key Reply

Key Reply message is sent by the server in response to a Key Request message. The Key Reply may include a randomly generated sub-key, encrypted with the session key shared between the client and the server. The sub-key length is DOI-specific. The Key Reply includes some additional information, needed to establish security parameters. The key reply message includes the following fields:

Identifier for the target protocol for which keys are being established.

Application role—identifies a specific application for which keys are being established.

Encrypted sub-key that is used to derive keys to secure a target protocol or object.

Encryption and authentication algorithms that should be used for securing a target protocol or object.

Encrypted DOI object that may contain some application-specific or protocol-specific parameters.

The period within which the sub-key is valid.

A flag indicating if the new sub-key should be negotiated automatically before the old one expires.

A flag indicating if the recipient of this message should follow up with the Security Established message.

A MAC for providing message integrity

Security Established

The Security Established message is sent by a client to the server to acknowledge that it received a Key Reply and successfully set up new security parameters. This message may only be sent when ACK_REQ flag is set in the Key Reply. In the cases when the server initiated the key management with a Ticket Challenge it would want to see this acknowledgment and therefore may request it by setting the ACK-required flag in the Key Reply. This message includes the following fields:

Identifier for the target protocol for which keys are being established.

Application role—identifies a specific application for which keys are being established.

A MAC that covers both this message and the preceding Key Reply message.

Message CLIENT_ENROLL_REQ

The message CLIENT_ENROLL_REQ is sent to KDC 204 by a client that wants to update its public key or specify a new public key that is not yet in KDC 204 database and doesn't have a corresponding digital certificate. This message may be authenticated with Provisioning Ticket and a checksum that is keyed with the Provisioning Key (session key in the Provisioning Ticket). A Provisioning Server may obtain a Provisioning Ticket on behalf of some ESBroker™ principal using an INIT_PRINCIPAL_REQ message. A Provisioning Server would then use an out-of-band method of forwarding the Provisioning Ticket and corresponding Provisioning Key to the client, which will then generate this CLIENT_ENROLL_REQ. The client may also specify which type of KDC 204 certificates it would accept (in the AS_REP message). If the corresponding attribute (KDC 204

CertificateType) is not present, this client does not support any kind of KDC 204 certificates. Upon receiving this message, KDC 204 will decide based on its policy if it should store the public key, issue a client a certificate or both. KDC 204 will also decide what type of certificate to issue. A client does not care what kind of certificate KDC 204 will issue, because it does not have to parse its own certificates. When a client is issued a certificate, it has to treat it as an opaque blob. A client is responsible only for storing its own certificate and for including it in the AS_REQ messages.

Message CLIENT_ENROLL_REP

This message is a reply to CLIENT_ENROLL_REQ. It either acknowledges that the client public key has been updated or specifies a new client certificate for the public key or both. The action taken by KDC 204 before sending this message is based on its configured policy. This message is authenticated with a keyed checksum, using the same Provisioning Key that was used to authenticate the request. Although not shown, one of ordinary skill in the art will realize that various other messages consistent with the spirit and scope of the present invention may be used.

Media Stream Key Management

Media stream key management is the protocol specific to IPRM as identified by the DOI_ID attribute used in the Ticket Challenge, KEY_REQ, KEY_REP and Security Established messages.

These messages can optionally carry a $3^{rd}$ party authenticator corresponding to a DOI object. This authenticator is useful in the case that the originator of the DOI object is not the sender of the key management message, but some other $3^{rd}$ party. For media stream security, in some cases such an authenticator is required, while in other cases it is not.

IPRM DOI objects contain a session rights object or session ID—a random number that uniquely identifies a point-to-point secure session. Session ID generation does not require a strong random number generator—any software-based pseudo-random generator is sufficient. When one of the endpoints generates the session ID, it insures that it is unique for that host. Whenever a Session ID collision is detected, the endpoint where the collision occurred may return an application error code and the endpoint that generated this Session ID will generate another random value and retry. Note that normally the DOI object is encrypted inside the KEY_REQ or KEY_REP message.

Media Stream DOI Objects

There are several types of IPRM DOI objects that may be used in media stream key management:

Session Rights
Session ID

Session Rights DOI Object

The Session Rights are normally sent with the KEY_REQ message when consumer 216 wishes to request a secure session from the caching server to view a program. The Session Rights are obtained by consumer 216 from content provider 202. Consumer 216 (viewer software) then places this DOI Object inside the KEY_REQ message, which is later validated by the appropriate caching server. The session rights are accompanied by a $3^{rd}$ party authenticator such that the caching server may verify that it was content provider 202 that generated both the session rights and this authenticator.

The session rights include the Session ID that identifies a particular content streaming or distribution session and an expiration time for these session rights. The session rights also include a user selection that for example includes:

Purchase option selected by consumer 216. For example, the purchase option may indicate that the content is free, selected on a subscription basis, on a pay-per-view basis, or pay-by-time basis (price varies depending on how much of the content was watched).

The purchase price of the content

The same session rights may also include content rules such as:

Restriction of distribution of this content to a specific country

Restriction of distribution of this content to a specific geographic area

List of Service IDs under which this content is offered for subscription

In general, these rules and selections may be arbitrarily complex and may be expressed in different formats including TLV (Type-Length-Value) encoding, XML, etc.

Session ID DOI Object

The Session ID DOI object is used both in the KEY_REQ and KEY_REP messages. When a caching server requests content from another caching server, the Session ID DOI object will be included in the KEY_REQ message sent from the requesting caching server. The Session ID DOI object is sent as part of KEY_REP message when a caching server requests content from content provider 202. The caching server in this case initiates the key management exchange with the TKT_CHALLENGE message and does not have an opportunity to specify the session ID until it sends the KEY_REP message.

Since this type of DOI Object is not created by a $3^{rd}$ party, it does not require an additional 3rd party authenticator.

Key Derivation

This key derivation procedure is specific to the IPRM DOI_ID value and is applicable to media streams as well as other target protocols that fall under the same DOI_ID. After the Target Application Secret (TAS) (a concatenation of the session key and the sub-key) has been established with key management, it is used to derive the following set of keys in the specified order. A client derives:

Outbound EK, content encryption key for outbound messages. The length is dependent on the selected cipher.

Outbound $K_{MAC}$, a MAC (Message Authentication Code) key used in the generation of a MAC for authenticating outbound messages. The key length is dependent on the selected message authentication algorithm.

Inbound EK, content encryption key for inbound messages.

Inbound $K_{MAC}$, a MAC key used for authenticating inbound messages.

An application server derives:
Inbound EK
Inbound $K_{MAC}$
Outbound EK
Outbound $K_{MAC}$ Note that the derivation order of the inbound and outbound keys at the client and server are reversed—this is because the same key used to encrypt outbound traffic on one side is used to decrypt inbound traffic on the other side. Similarly, a MAC key used to generate MACs for outbound messages on one side is used to verify the MAC values on inbound messages on the other side.

Also, it should be observed that not all the keys are used for each protocol. For example, RTP only uses EK, the encryption key, and only for one direction of traffic—because within IPRM there are no two-way RTP sessions (clients don't send RTP packets back to streaming servers). The key derivation function is a one-way function. Given one of the derived keys, it is not feasible to determine the value of a TAS (target application secret).

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. An authentication system allowing an authorized user to stream content from a caching server within a computing network, the system comprising:

the caching server;

a content provider configured for providing the content to the caching server for access by the user;

a key distribution center configured for:

receiving from the content provider a first request to access the caching server, and if authenticated the content provider delivers the content to the caching server; and receiving from the user a second request to access the caching server, and if authenticated the user is allowed to stream the content from the caching server.

2. The authentication system of claim 1 wherein the second request is for a caching server ticket to access the caching server.

* * * * *